US012714542B2

(12) United States Patent
Liu et al.

(10) Patent No.: US 12,714,542 B2
(45) **Date of Patent: *Aug. 25, 2026**

(54) METHODS FOR MANDIBULAR RELOCATION

(71) Applicant: ALIGN TECHNOLOGY, INC., San Jose, CA (US)

(72) Inventors: Ping Liu, Apex, NC (US); Luyao Cai, Santa Clara, CA (US)

(73) Assignee: Align Technology, Inc., San Jose, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 18/667,873

(22) Filed: May 17, 2024

(65) Prior Publication Data

US 2024/0415613 A1 Dec. 19, 2024

Related U.S. Application Data

(63) Continuation of application No. 17/248,749, filed on Feb. 5, 2021, now Pat. No. 12,076,207.

(60) Provisional application No. 62/970,312, filed on Feb. 5, 2020.

(51) Int. Cl.

| | |
|---|---|
| ***A61C 7/08*** | (2006.01) |
| ***A61C 7/00*** | (2006.01) |
| ***A61C 7/36*** | (2006.01) |
| ***G06F 18/22*** | (2023.01) |

(52) U.S. Cl.

CPC ................ *A61C 7/08* (2013.01); *A61C 7/002* (2013.01); *A61C 7/36* (2013.01); *G06F 18/22* (2023.01); *G06V 2201/034* (2022.01)

(58) Field of Classification Search

CPC .. A61C 7/36; A61C 7/002; A61C 7/08; G06K 9/6215; G06V 2201/034; A61F 5/56; A61F 5/566; A61F 2005/563

See application file for complete search history.

(56) References Cited

U.S. PATENT DOCUMENTS

| | | | | |
|---|---|---|---|---|
| 11,810,271 | B2 | 11/2023 | Shi et al. | |
| 2015/0238280 | A1 * | 8/2015 | Wu ........................ | A61C 7/002 |
| 2017/0035534 | A1 * | 2/2017 | Ross ......................... | A61F 5/56 |

(Continued)

*Primary Examiner* — Heidi M Eide
*Assistant Examiner* — Lina Faraj
(74) *Attorney, Agent, or Firm* — FisherBroyles, LLP

(57) ABSTRACT

The disclosed computer-implemented method for selecting locations of mandibular relocation features (MRFs) on oral appliances may include determining candidate locations for placing an MRF on a first oral appliance for a first stage of mandibular relocation (MR) treatment and determining candidate locations for placing an MRF on a second oral appliance for a second stage. The method may include selecting from the candidate locations for the first stage and the second stage based on decreasing a distance between the selected pair of candidate locations. The method may further include processing multiple MRFs in parallel. The method may also include increasing a number of initial candidate locations. Locations for intermediate stages may be selected based on interpolating between the first and second stages or based on decreasing a distance between the selected pair if the interpolation fails. The intermediate stages may be processed using a binary search or a linear search.

20 Claims, 9 Drawing Sheets

(56) References Cited

U.S. PATENT DOCUMENTS

| | | | | |
|---|---|---|---|---|
| 2019/0125494 | A1* | 5/2019 | Li ............................ | A61C 7/36 |
| 2021/0134436 | A1 | 5/2021 | Meyer et al. | |

* cited by examiner

METHODS FOR MANDIBULAR RELOCATION

RELATED APPLICATIONS

This application is a continuation of U.S. patent application Ser. No. 17/248,749, filed Feb. 5, 2021, now U.S. Pat. No. 12,076,207, issued Sep. 3, 2024, which claims the benefit under 35 U.S.C. § 119(e) of U.S. Provisional Patent Application No. 62/970,312, filed Feb. 5, 2020, the disclosures of which are incorporated, in their entirety, by this reference.

BACKGROUND

Oral appliances, such as aligners, may be used for various treatments of a patient's dentition, such as orthodontic treatments. For example, aligners are often used for moving teeth into correct placement. Oral appliances may also be used for mandibular relocation (MR) treatment by gradually relocating a patient's mandible into correct placement. In some instances, the teeth of the patient's upper and lower jaws may contact in an incorrect or sub-optimal manner, e.g. crowding, crossbite or deep bite. A proper fit of the occlusal surfaces of the teeth is helpful for chewing as well as aesthetic appearances. The proper fit can be related to the relative positions of the mandible and maxilla, either of which may be retruded or protruded relative to the ideal position. The MR treatment can be used to change the relative position of the upper and lower jaws toward a more optimal alignment. The MR treatment may utilize mandibular relocation features (MRF) on oral appliances. The MRFs may be protrusions extending from aligners. Contact between corresponding pairs of MRFs, such as between corresponding MRFs from upper and lower aligners, may apply force to gradually relocate the patient's mandible.

The oral appliances may be used exclusively for MR treatment or used for simultaneous treatment, such as MR treatment with teeth alignment treatment. Teeth alignment treatment may involve various stages. Each stage may involve an aligner worn by the patient for several weeks and designed to incrementally shift teeth compared to a prior stage. MR treatment may be more gradual and may require longer treatment. For instance, MR treatment often relies on several tracks of treatment, each track including a series of MR relocation stages.

The placement of MRFs for each stage of each track may be selected to advance the patient's mandible, but may be limited by various constraints. For example, certain locations may be unfeasible due to structural weaknesses, manufacturing constraints, material limitations, etc. Other constraints may include human constraints, such as limitations due to the patient's oral structure or facial structure, incompatibility with other orthodontic treatments, etc. Despite the constraints, there may be various candidate locations available for MRFs at each stage.

A series of candidate MRF locations may be selected for each stage of each track of the MR treatment. However, determining viable candidate locations for the MRFs may be a resource-intensive process. Therefore conventionally, the first candidate location found for each stage may be selected. However, an unintended consequence may be that the location of the MRF from one stage to the next may change substantially. In particular, the change in location of the MRF from the end stage of an MR track to the start stage of the next MR track may be significant such that the patient may feel less comfortable than would be ideal, or they are not able to get used to the new MRF position. MR treatment may be less effective if the patient does not correctly use the oral appliance, for example due to lack of comfort. Work in relation to the present disclosure suggests that it may be desirable to decrease the distance between MRF locations between stages without requiring significant resources and time to select MRF locations.

The present disclosure, therefore, identifies and addresses a need for systems and methods for selecting locations of MRFs on oral appliances which may decrease or minimize changes between successive stages of treatment.

SUMMARY

As will be described in greater detail below, the present disclosure describes various systems and methods for selecting locations of MRFs on oral appliances. Candidate locations for placing an MRF for a first stage of mandibular relocation (MR) treatment and candidate locations for placing an MRF for a second stage of MR treatment may be determined. By comparing the candidate locations for the first and second stages, the systems and methods described herein may decrease a distance between the selected pair of candidate locations. The systems and methods described herein may improve MRF location selection when compared to conventional approaches which may merely select the first available candidate location for each stage.

In addition, the systems and methods described herein may improve the functioning of a computing device by selectively targeting locations, thereby improving processing efficiency of the computing device over conventional approaches. These systems and methods may also improve the field of MR treatment by decreasing a distance change for MRFs between stages, which may improve patient comfort and effectiveness of the MR treatment.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The presently disclosed methods and apparatus are well suited for combination with many prior approaches to MR. For example, the presently disclosed methods and apparatus can be combined with appliances with MRFs such as precision wings and occlusal blocks, so as to decrease large jumps between stages of the MR treatment. In some embodiments, only a limited number of candidate points are available for the MRFs at each stage of the treatment that would provide appropriate amounts of mandibular movement, and the presently disclosed methods and apparatus decrease the distances that the MRFs move between stages of treatment while utilizing acceptable candidate points. Also, although reference is made to thermoforming appliances with MRFs, the appliances and MRFs can be manufactured together, for example with additive manufacturing such as 3D printing in order to manufacture the appliance with MRFs in accordance with a treatment plan.

Figure 1:
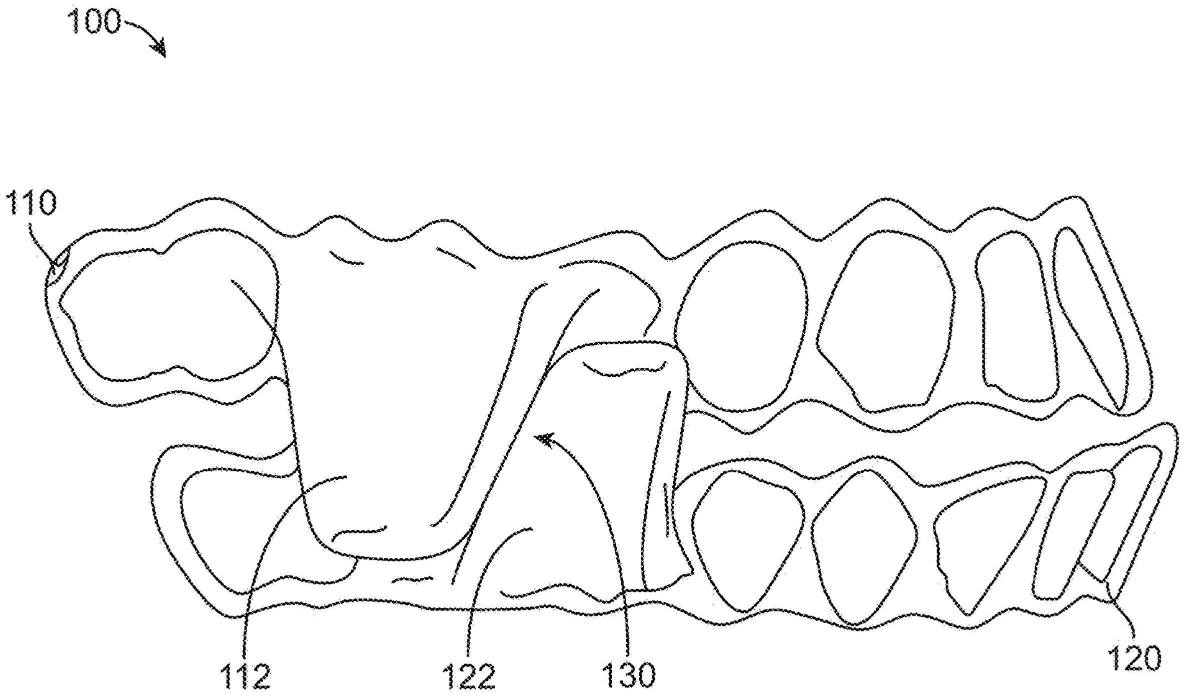
FIG. 1 shows an example of an oral appliance having mandibular relocation features, in accordance with some embodiments.
Figure 2:
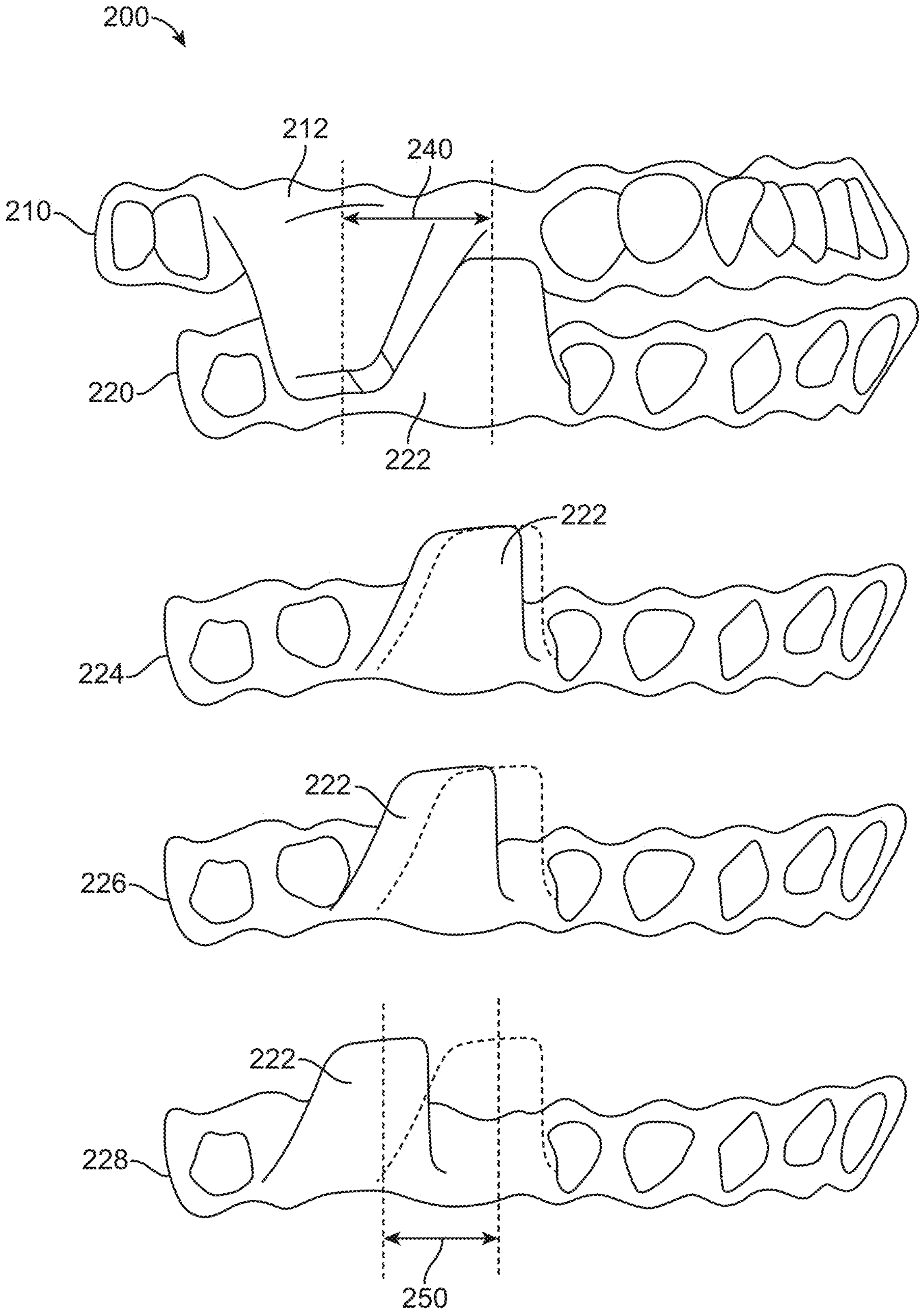
FIG. 2 shows examples of locations of mandibular relocation features on oral appliances, in accordance with some embodiments.

The following will provide, with reference to FIGS. 1-2, detailed descriptions of an example oral appliance having MRFs at various locations. Detailed descriptions of candidate locations for positioning MRFs will be provided in connection with FIGS. 3A-B. Detailed descriptions of example systems for selecting locations of MRFs on oral appliances will be provided in connection with FIG. 4. Detailed descriptions of corresponding computer-implemented methods will also be provided in connection with FIG. 5. Detailed descriptions of tracks and stages of treatment will be provide in connection with FIG. 6. Detailed descriptions of additional methods for selecting MRF locations will also be provided in connection with FIG. 7. In addition, detailed descriptions of an example computing system and network architecture capable of implementing one or more of the embodiments described herein will be provided in connection with FIGS. 8 and 9, respectively.

FIG. 1 illustrates an oral appliance 100 which may be used for MR treatment. Oral appliance 100 may include an upper shell 110, which may have one or more teeth-receiving cavities for receiving teeth of an upper jaw, and a lower shell 120, which may have one or more teeth-receiving cavities for receiving teeth of a lower jaw. Upper shell 110 may include an upper mandibular relocation feature 112, which may comprise a protrusion extending downwards (e.g. toward the lower jaw). Lower shell 120 may include a lower mandibular relocation feature 122, which may comprise a protrusion extending upwards (e.g., toward the upper jaw). Upper MRF 112 may engage lower MRF 122 along an engagement region 130 when oral appliance 100 is worn by a patient and upper shell 110 and lower shell 120 are brought together (e.g., when the patient closes his or her mouth). This engagement may produce an anterior force that may displace lower shell 120 anteriorly relative to upper shell 110, which may push the patient's mandible in an anterior direction.

Although oral appliance 100 depicts upper MRF 112 and lower MRF 122 as located on the buccal surfaces of upper shell 110 and lower shell 120, respectively, in other embodiments, upper MRF 112 and/or lower MRF 122 may be located on other surfaces, such as on the lingual surfaces or occlusal surfaces. In addition, although FIG. 1 depicts a single pair of MRFs, oral appliance 100 may include multiple pairs of MRFs. Moreover, the shapes of upper MRF 112 and/or lower MRF 122 may vary, for instance having complementary shapes for mating in order to improve the stability of engagement region 130.

The upper MRF 112 and the lower MRF 122 may comprise one or more structures suitable for MR, such as rigid precision wings, curved precision wings or mandibular advancement blocks, and combinations thereof. In some embodiments, the precision wings comprising wing like structures, e.g. protrusions, extending to one or more sides of the appliance to engage each other and generate the MR forces at engagement region 130. The protrusions of the precision wings may comprise complimentary curved engagement surfaces, or substantially flat inclined engagement surfaces, that engage each other to generate the MR forces. The protrusions of the precision wings may comprise stiff structures, for example rigid structures, in order to transmit the mandibular relocation forces to the appliance. The occlusal blocks may comprise protrusions extending between occlusal surfaces of the appliances, which comprise surfaces sized and shaped to engage each other to generate the MR forces with engagement region 130 located between the upper and lower jaw. The upper MRF 112 and the lower MRF 122 may comprise any suitable combination of these structures in order to generate the MR forces at the engagement region 130.

Upper shell 110 and/or lower shell 120 may each comprise a polymeric shell appliance having a thickness suitable for MR treatment. In some embodiments the polymeric shell thickness may be no more than about 2 millimeters, and, in some embodiments, the polymeric shell's thickness may be within a range from about 0.2 millimeter to about 2 millimeters. The polymeric shell may comprise a plurality of layers, for example.

Although the embodiment of FIG. 1 illustrates an oral appliance in the form of an aligner for MR, other types of oral appliances are suitable for use in accordance with the present disclosure. For example, oral appliance 100 may comprise a retainer, a palatal expander, a nightguard, an apnea appliance, or a functional appliance. The appliance and MRFs can be manufactured in many ways and may comprise a 3D printed aligner with MRFs, in which the aligner and MRFs have been 3D printed together, or an aligner formed on a 3D thermoforming mold with MRFs placed on the 3D thermoforming mold.

FIG. 2 shows examples of locations of mandibular relocation features on oral appliances. An oral appliance 200, which may correspond to oral appliance 100. Oral appliance 200 may include an upper shell 210, which may correspond to upper shell 120, and a lower shell 220, which may correspond to lower shell 120. Upper shell 210 may include an upper MRF 212, which may correspond to upper MRF 112, and lower shell 220 may include a lower MRF 222, which may correspond to lower MRF 122. Upper MRF 212 may engage with lower MRF 222 when upper shell 210 and lower shell 220 are brought together (e.g., when the patient's jaws are closed) to advance the patient's mandible anteriorly, as part of the patient's MR treatment. Although reference is made to moving the mandible anteriorly, in some embodiments, the mandible can be moved posteriorly, e.g. for mandibular retraction.

A degree of mandibular relocation may be controlled by relative positioning of upper MRF 212 and/or lower MRF 222 along upper shell 210 and lower shell 220, respectively, and/or by a centerline-to-centerline distance 240 as shown in FIG. 2. For a given relative jaw position, lower MRF 222 may be placed more posteriorly in order to increase mandibular relocation. Thus, the locations of upper MRF 212 and/or lower MRF 222 may vary as appropriate in order to achieve a desired amount of jaw displacement. FIG. 2 illustrates lower shell 224, lower shell 226, and lower shell 228, each of which may correspond lower shell 220 at different stages of treatment. Each of lower shells 224, 226, and 228 include lower MRF 222 positioned at different locations along the anterior-posterior axis of oral appliance 200. Each of lower shells 224, 226, and 228 may produce a different amount of mandibular relocation when worn with upper shell 210. Lower shells 224, 226, and 228 may be configured to produce increasing amounts of mandibular relocation up to a targeted relocation amount 250 for at least a portion of the patient's MR treatment, which may also be a maximum relocation amount. In addition to repositioning lower MRF 222, upper MRF 212 and/or both upper MRF 212 and lower MRF 222 may be repositioned along the respective shells (e.g., moved along the patient's jaw arch) if the originally selected position violates any constraints due to dentition changes, mandibular advancement, etc.

Different oral appliances (e.g., lower shells 220, 224, 226, and/or 228) may be sequentially applied to the patient, for instance, to titrate for a targeted or optimal amount of mandibular relocation, or to produce incremental staging towards a targeted or optimal advanced position to promote patient comfort. For example, a targeted or optimal mandibular relocation amount may be determined for the patient during a diagnostic stage. A system of oral appliance may be fabricated where MRFs on the upper and/or lower shells may be offset from the MRFs of other shells, such as by a distance in the range from about 2 mm to about 5 mm. The geometric parameters of the MRFs may also be modified based on patient-specific factors and/or desired treatment regimen. Geometric parameters may include, without limitation, structure height, width, thickness, angle, and shape. The geometry of the MRF may be adjusted such that oral appliances may be designed in a patient-specific manner to produce a specified jaw configuration (e.g., amount of mandibular relocation, amount of vertical distance between upper and lower jaws, etc.). Examples of MRFs suitable for incorporation in accordance with the present disclosure are also described in U.S. Pat. No. 9,844,424, entitled "Dental Appliance with Repositioning Jaw Elements", issued Dec. 19, 2017, the entire disclosure of which is incorporated herein by reference.

Although the embodiments and methods described herein may refer to a single shell and a single MRF on a single appliance, in other embodiments the concepts described herein may be applied to more than one shell and/or MRF. In addition, in some embodiments, the methods described herein may be applied in parallel for multiple shells and/or MRFs.

Although FIG. 2 shows a generally linear change in the position of the MRFs, which may correspond to a single track of treatment comprising plurality of tracks, work in relation to the present disclosure suggests that for larger displacements of the mandible in at least some patients, the initial points used for the first part of the MR treatment may not be suitable for subsequent movement at later stages of treatment. Initially, there may be a limited number of candidate points for placement of the MRFs for one stage of the treatment, such as from about 12 to 20 candidate points on the appliance. Factors that can be related to the suitability of a candidate point include thermoforming complexity, an appropriate angle of the engagement surfaces, proximity to the occlusal surface and proximity to the buccal or lingual surfaces. For example, as the mandible is advanced, the initial locations for the first track may not be suitable for movement with a second track. Therefore, as the MR treatment proceeds, it can be beneficial to change the locations of the pair of MRFs to locations that are better suited for the MR treatment and also decrease movement of the MRFs among the stages and tracks.

Figure 3B:
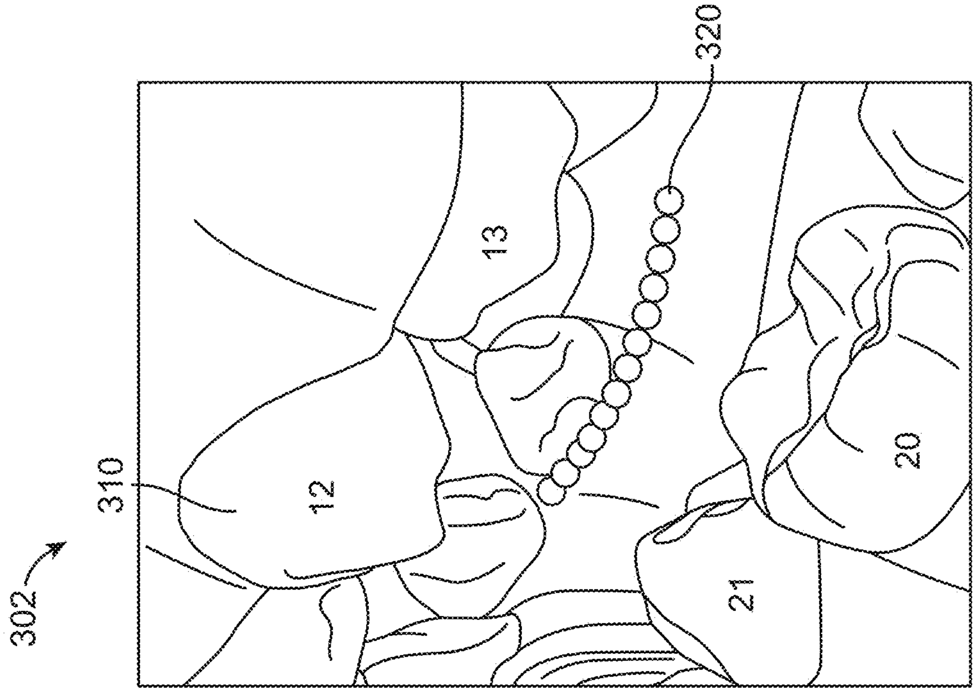
FIGS. 3A-B show illustrations of candidate locations for placing mandibular relocation features, in accordance with some embodiments.
Figure 3A:
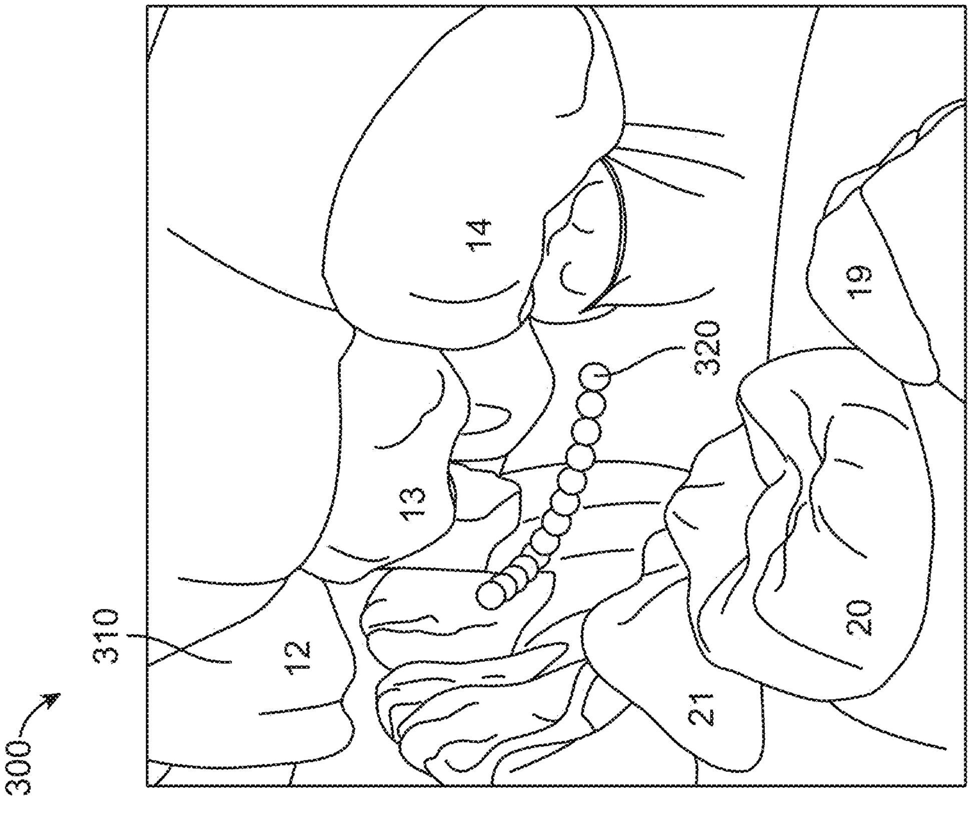

FIGS. 3A-B illustrate models 300 and 302, respectively, of different partial views of a patient's jaw arch for a single stage of treatment. As seen in FIGS. 3A-B, each tooth 310 may be numerically labeled (e.g., from 1-32 or other indexing system) to identify each tooth 310, although in other implementations teeth 310 may be labeled with other identifiers. Possible locations for placing MRFs may be identified with respect to teeth 310, for example based on the labels for teeth 310.

In some implementations, the locations may be more granularly defined. FIGS. 3A-B show locations 320 along the patient's jaw arch. Locations 320 may be defined with respect to the jaw arch and in some implementations, further defined with respect to a tooth 320 (e.g., tooth "20" in FIGS. 3A-B). For example, with tooth "20" as a reference, locations 320 may be defined as offsets along the reference tooth. Alternatively, locations 320 may be determined and associated with the nearest tooth 310 for indexing.

Locations 320 may also be indexed, such as 1-13 in FIGS. 3A-B, although in other implementations other indexing values may be used. In some implementations, the reference tooth (e.g., tooth "20") may remain constant for the MR treatment such that locations 320 depicted in FIGS. 3A-B may include all possible candidate locations for a single MRF.

Figure 4:
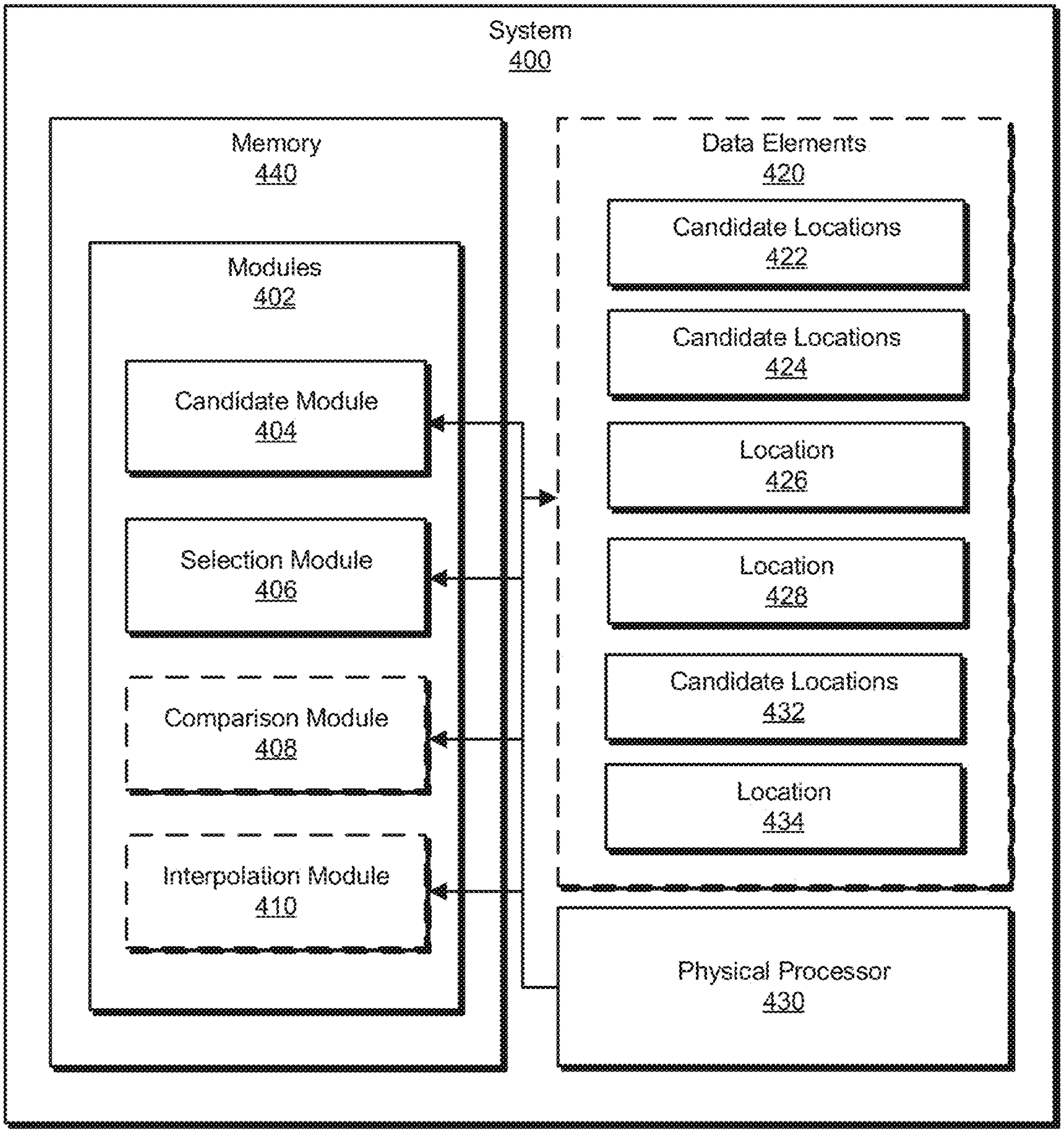
FIG. 4 shows a block diagram of an example system for selecting locations of mandibular relocation features on oral appliances, in accordance with some embodiments.

FIG. 4 is a block diagram of an example system 400 for selecting MRF locations on oral appliances. As illustrated in this figure, example system 400 may include one or more modules 402 for performing one or more tasks. As will be explained in greater detail below, modules 402 may include a candidate module 404, a selection module 406, a comparison module 408, and an interpolation module 410. Although illustrated as separate elements, one or more of modules 402 in FIG. 4 may represent portions of a single module or application.

In certain embodiments, one or more of modules 402 in FIG. 4 may represent one or more software applications or programs that, when executed by a computing device, may cause the computing device to perform one or more tasks. For example, and as will be described in greater detail below, one or more of modules 402 may represent modules stored and configured to run on one or more computing devices, such as the devices illustrated in FIG. 8 (e.g., computing system 810) and/or FIG. 9. One or more of modules 402 in FIG. 4 may also represent all or portions of one or more special-purpose computers configured to perform one or more tasks.

As illustrated in FIG. 4, example system 400 may also include one or more memory devices, such as memory 440. Memory 440 generally represents any type or form of volatile or non-volatile storage device or medium capable of storing data and/or computer-readable instructions. In one example, memory 440 may store, load, and/or maintain one or more of modules 402. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 440. Additionally or alternatively, physical processor 430 may execute one or more of modules 402 to facilitate selection of MRF locations. Examples of physical processor 430 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 4, example system 400 may also include one or more data elements 420, such as candidate locations 422, candidate locations 424, location 426, location 428, candidate locations 432, and location 434. Data elements 420 generally represent any type or form of data and permutations thereof. Data elements 420 may correspond to cached or otherwise stored data values for computation.

Example system 400 in FIG. 4 may be implemented in a variety of ways. For example, all or a portion of example system 400 may represent portions of example computing system 810 in FIG. 8, described in greater detail below. In one example, all or a portion of the functionality of modules 402 may be performed by computing device 810 and/or any other suitable computing system. As will be described in greater detail below, one or more of modules 402 from FIG. 4 may, when executed by at least one processor of system 400 (e.g., physical processor 430), enable system 400 to select MRF locations. For example, and as will be described in greater detail below, one or more of modules 402 may cause system 400 and or computing device 810 to determine candidate locations for each stage, and select locations from the candidate locations based on decreasing a distance between the selected locations.

Figure 5:
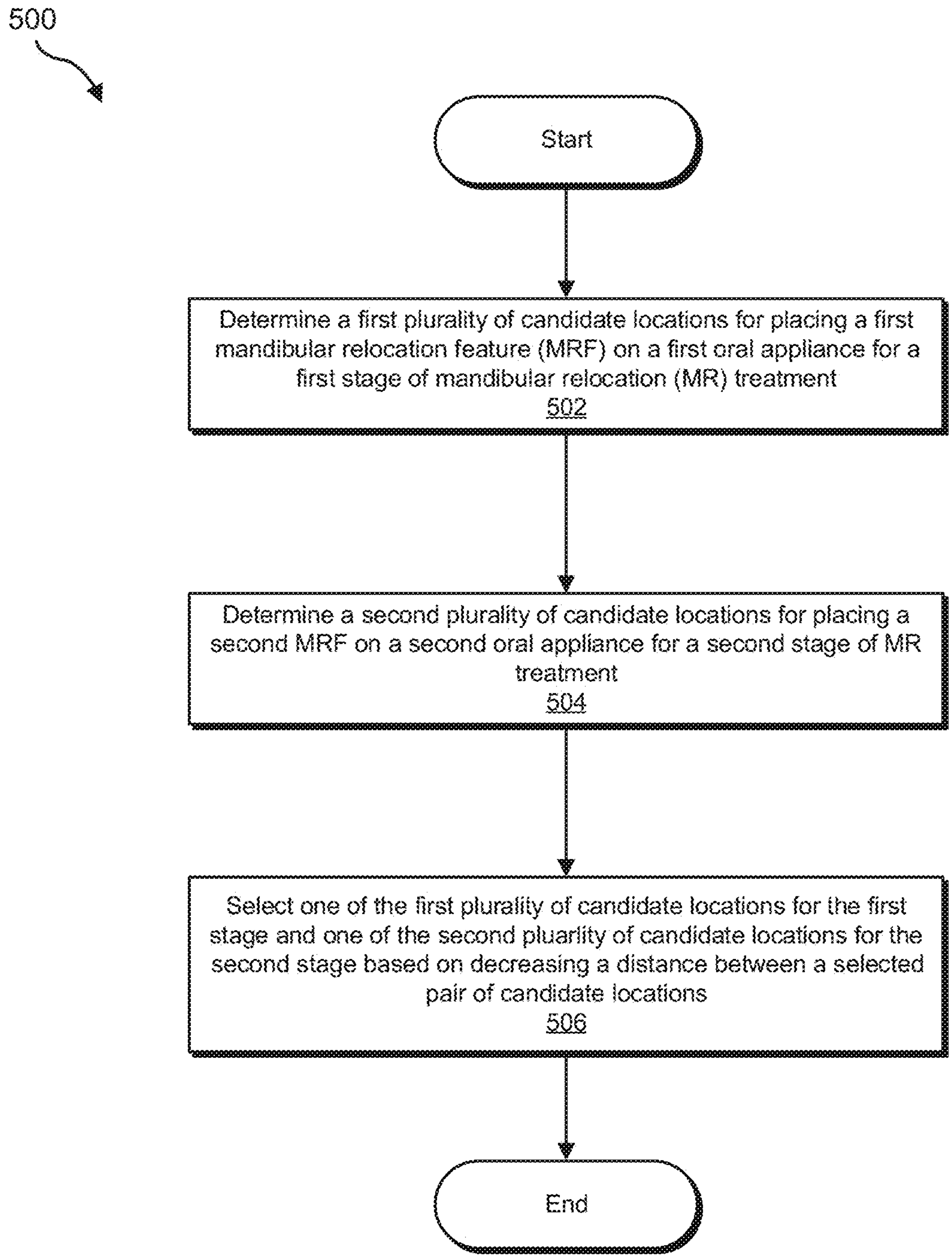
FIG. 5 shows a flow diagram of an example method for selecting locations of mandibular relocation features on oral appliances, in accordance with some embodiments.

FIG. 5 is a flow diagram of an example computer-implemented method 500 for selecting locations of MRFs on oral appliances. The steps shown in FIG. 5 may be performed by any suitable computer-executable code and/or computing system, including system 400 in FIG. 4, computing system 810 in FIG. 8, and/or variations or combinations of one or more of the same. In one example, each of the steps shown in FIG. 5 may represent an algorithm whose structure includes and/or is represented by multiple substeps, examples of which will be provided in greater detail below.

As illustrated in FIG. 5, at step 502 one or more of the systems described herein may determine a first plurality of candidate locations for placing a first MRF on a first oral appliance for a first stage of MR treatment. For example, candidate module 404 may determine candidate locations 422. The candidate locations may be identified by index values, for instance corresponding to designated locations along the oral appliance, coordinates, distances from a reference point, etc.

Candidate module 404 may determine candidate locations 422 for placing a first MRF on a shell of a first oral appliance for a first stage of MR treatment. In some embodiments, the patient's MR treatment may be concurrent with another orthodontic treatment for the patient, such as repositioning the patient's teeth. In such embodiments, the oral appliances may comprise a plurality of aligners to move a plurality of teeth from a plurality of first locations to a plurality of second locations with a plurality of tooth movement stages.

In some embodiments, when candidate module 404 evaluates a candidate location (e.g., one of locations 320 in FIGS. 3A-B) for suitability to place an MRF, candidate module 404 may implement a corresponding static routine, which may be based on the relative position of the location and/or a type and/or geometry of the MRF, to first rotate and/or translate the MRF to a suitable initial position. If this candidate location satisfies all constraints, candidate module 404 may add this location, as a viable candidate location, to candidate locations 422.

Figure 6:
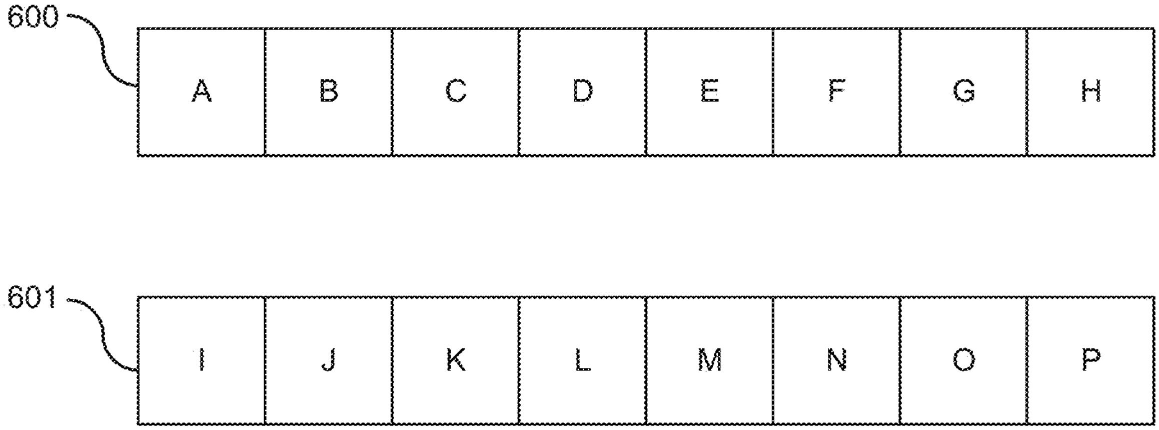
FIG. 6 shows a block diagram of example of tracks and stages of mandibular relocation treatment, in accordance with some embodiments.

The MR treatment may comprise a plurality of tracks, each of which comprises a plurality of stages. FIG. 6 shows a track 600 and a track 601, which may correspond to consecutive tracks of a patient's MR treatment. Track 600 may include a series of stages, labeled A-H. Track 601 may include a series of stages, labeled I-P. As described herein, decreasing a distance between MRF locations within a track (e.g., throughout stages A-H, and/or throughout stages I-P), and/or decreasing a distance between MRF locations of the next track (e.g., when transitioning from stage H to stage I) may be desirable.

Candidate module 404 may determine candidate locations 422 based on parameters such as a targeted mandibular relocation amount, geometric parameters, and other factors including patient-specific factors, manufacturing factors, structural considerations of the oral appliances, etc. Candidate module 404 may further determine candidate locations 422 based on a target mandibular relocation appropriate for the first stage of MR treatment. The first stage may correspond to any stage of MR treatment, such as a start stage of a first track (e.g., stage A in FIG. 6), or any other stage of any other track during the MR treatment.

In some implementations, candidate module 404 may modify the parameters in order to change the pool of candidate locations 422. For example, candidate module 404 may remove certain constraints and/or constraining factors or otherwise change parameters (e.g., geometric parameters, offsets, etc.) in order to increase a number of candidate locations 422. Increasing the number of candidate locations 422 may increase a likelihood of finding matching candidate locations 424, as will be described further below. Alternatively, candidate module 404 may add additional constraints or otherwise change parameters to decrease the number of candidate locations 422. Decreasing the number of candidate locations 422 may simplify processing for finding MRF locations.

Although the systems and methods described herein, including system 400 and/or method 500, are described with respect to a single MRF, in other embodiments the methods and steps described herein may be repeated asynchronously for other MRFs located on the same oral appliance. As described above, an oral appliance, such as oral appliance 100, may include multiple MRFs. In some embodiments, oral appliance 100 may include four MRFs, one for each buccal block of the patient's jaw arch. Thus, upper shell 110 may include two upper MRFs 112, and lower shell 120 may include two lower MRFs 122. The methods described herein may be applied to each MRF, for example in parallel when parallel processing is available.

At step 504, one or more of the systems described herein may determine a second plurality of candidate locations for placing a second MRF on a second oral appliance for a second stage of MR treatment. For example, candidate module 404 may determine candidate locations 424 based on a targeted mandibular relocation amount for the second stage, geometric parameters, and other factors as described herein. The second stage may correspond to any stage of MR treatment succeeding the first stage.

As detailed above, conventional methods of selecting locations may result in an unpredictable shift in locations between stages. Certain shifts may be uncomfortable for the patient. For example, the first stage may correspond to a start stage of a first track of MR treatment (e.g., stage A) and the second stage may correspond to an end stage of the first track (e.g., stage H). In other implementations the first and second stages may correspond to consecutive stages (e.g., stages A and B), stages spanning multiple tracks (e.g., stages H and I), etc.

In addition, similar to step 502 described above, candidate module 404 may modify parameters for selecting candidate locations 424 in order to increase or decrease a number of candidate locations 424. Moreover, candidate module 404 may perform steps 502-504 in parallel, for example with respect to other MRFs.

At step 506 one or more of the systems described herein may select one of the first plurality of candidate locations for the first stage and one of the second plurality of candidate locations for the second stage based on decreasing a distance between a selected pair of candidate locations. For example, selection module 406 may select location 426 from candidate locations 422 and location 428 from candidate locations 424. Once selection module 406 selects locations 426 and 428, candidate module 404 may stop searching for candidate locations for the first and second stages.

Selection module 406 may select location 426 and location 428 based on decreasing the distance, e.g. minimizing the distance, between location 426 and location 428. For instance, selection module 406 may determine whether location 426 is available from candidate locations 424 such that location 426 may be the same as location 428. If location 426 is not available from candidate locations 424, comparison module 408 may determine a nearest neighbor of location 426. Selection module 406 may then select the nearest neighbor as location 428.

Selection module 406 may consider location 428 and/or location 426 when selecting locations to decrease and/or minimize distances between locations for other stages and/or tracks. Although locations for other stages may be selected in a similar fashion, in some embodiments the selection of additional locations may vary. For example, in some embodiments candidate module 404 may determine a third plurality of candidate locations (e.g., candidate locations 432) for a third MRF for a third stage of MR treatment on a third oral appliance. The third stage may correspond to a start stage (e.g., stage I) of a second track (e.g., stage 601) of MR treatment and the second track may follow the first track. Selection module 406 may select, for the third stage of MR treatment, one of the third plurality of candidate locations based on decreasing a distance between a selected one of the second plurality of candidate locations (e.g., location 428) and the selected one of the third plurality of candidate locations (e.g., location 434).

In some embodiments, candidate module 404 may determine a third plurality of candidate locations (e.g., candidate locations 432) for a third MRF for a third stage of MR treatment on a third oral appliance. The third stage may correspond to a start stage (e.g., stage I) of a second track (e.g., track 601) and the second track may follow the first track. Candidate module 404 may determine a fourth plurality of candidate locations for a fourth MRF for a fourth stage of MR treatment on a fourth oral appliance. The fourth stage may correspond to an end stage (e.g., stage P) of the second track (e.g., stage 601). Selection module 406 may select one of the third plurality of candidate locations for the third stage and one of the fourth plurality of candidate locations for the fourth stage based on decreasing a distance between a selected one of the third plurality of locations and a selected one of the fourth plurality of candidate locations. Selection module 406 may select the selected ones of the third and fourth pluralities of locations to minimize the distance therebetween, for instance selecting matching locations. Alternatively, when matching locations are not available, comparison module 408 may select nearest neighbors.

Figure 7:
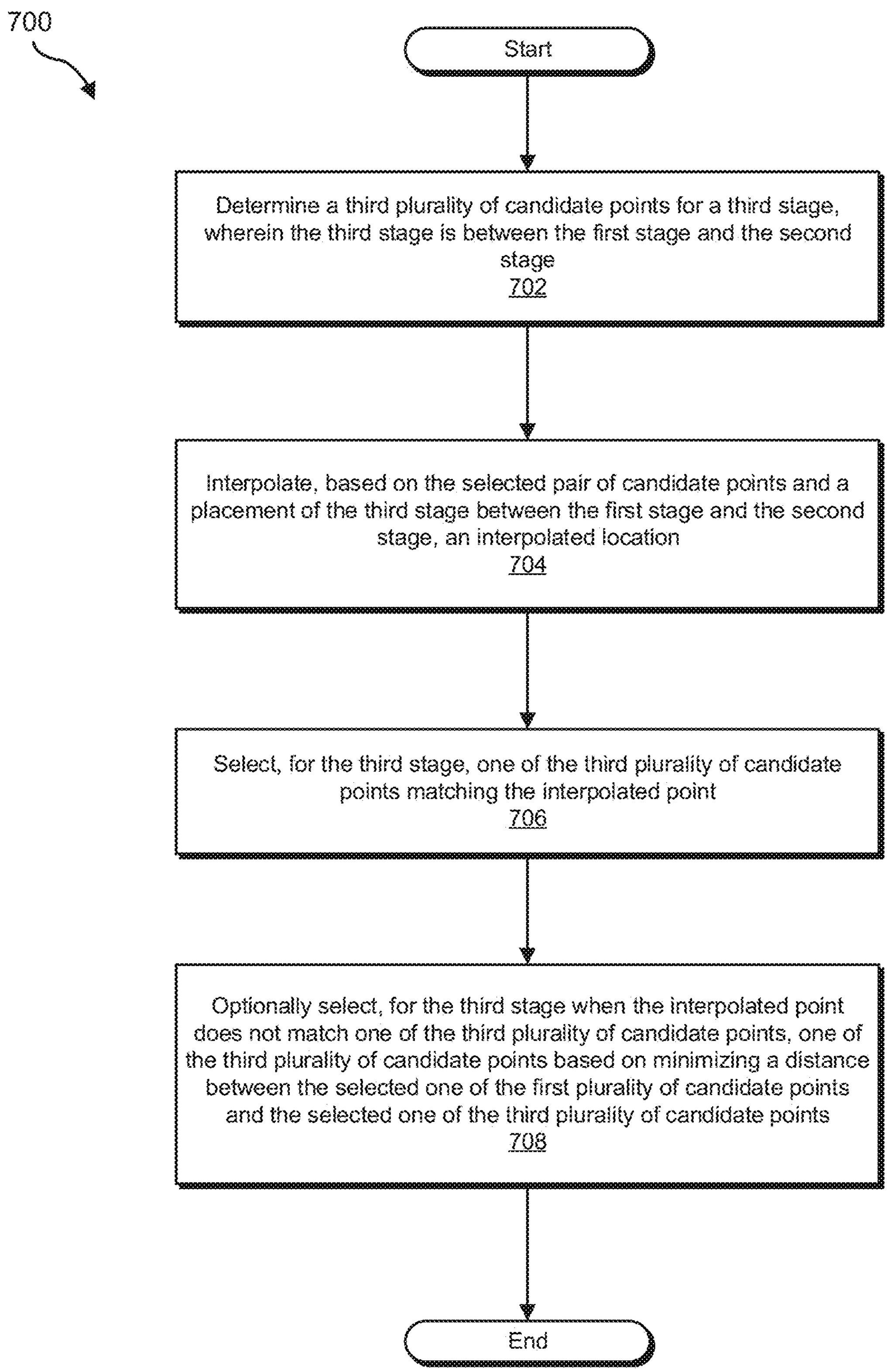
FIG. 7 shows a flow diagram of an example method for selecting locations of mandibular relocation features on oral appliances, in accordance with some embodiments.

FIG. 7 is a flow diagram of an example computer-implemented method 700 for selecting locations of MRFs on oral appliances. The steps shown in FIG. 7 may be performed by any suitable computer-executable code and/or computing system, including system 400 in FIG. 4 and/or variations or combinations of one or more of the same. In one example, each of the steps shown in FIG. 7 may represent an algorithm whose structure includes and/or is represented by multiple sub-steps, examples of which will be provided in greater detail below. Although method 700 is described herein with respect to the orthodontic treatment example, method 700 may be applied to other examples. In addition, method 700 may follow any of the methods described herein, for instance following method 500, or may be combined with any of the methods and/or steps described herein.

As illustrated in FIG. 7, at step 702 one or more of the systems described herein may determine a third plurality of candidate points for a third stage, which may be a first intermediate stage. The first intermediate stage may be between the first stage and the second stage. For example, the first intermediate stage may be one of stages 2-9 if the first stage is stage 1 and the second stage is stage 10. Candidate module 404 may determine candidate locations 432.

At step 704, one or more of the systems described herein may interpolate, based on the selected pair of candidate points and a placement of the first intermediate stage between the first stage and the second stage, an interpolated location. For example, interpolation module 410 may interpolate the interpolated location between location 426 and location 434 based on the placement of the first intermediate stage between the first and second stages.

The placement of the first intermediate stage between the first and second stages may weigh the interpolated location to favor the selected location of the first or second stage based on a closeness of the first intermediate stage to the first or second stage. For instance, if the first intermediate stage is closer to the first stage than the second stage (e.g., when there are more intermediate stages between the first intermediate and second stages than intermediate stages between the first and first intermediate stages), the selected location for the first intermediate stage may favor the selected location of the first stage over the selected location of the second stage. In one implementation, interpolation module 410 may utilize a linear interpolation between the selected locations of the first and second stages, which may be weighted based on how close the first intermediate stage is to the first and second stages. In other implementations, interpolation module 410 may utilize other interpolation schemes which may factor the first intermediate stage's closeness to the first and second stages.

In some embodiments, the first intermediate stage may correspond to an approximate midpoint stage (e.g., stage E) between the first stage (e.g., stage A) and the second stage (e.g., stage H). In such embodiments, interpolation module 410 may operate similarly to a binary search, by selecting successive midpoints until all stages have selected locations. In other words, the first intermediate stage may be selected (e.g., as a near midpoint between two currently examined stages) similar to how a next element in a binary search is selected. In other embodiments, the first intermediate stage may correspond to a stage immediately following the first stage (e.g., stage B). In such embodiments, interpolation module 410 may operate similarly to a linear search by iterating through consecutive stages until all stages have selected locations. In other words, the first intermediate stage may be selected (e.g., the next stage after a currently examined stage) similar to how a next element in a linear search is selected.

At step 706, one or more of the systems described herein may select, for the first intermediate stage, one of the third plurality of candidate points matching the interpolated point. For example, selection module 406 may select the interpolated location from candidate locations 432 as location 434.

At step 708, one or more of the systems described herein may optionally select, for the first intermediate stage when the interpolated point does not match one of the third plurality of candidate points, one of the third plurality of candidate points based on minimizing a distance between the selected one of the first plurality of candidate points and the selected one of the third plurality of candidate points. For example, selection module 406 may select, as location 434, one of candidate locations 432 based on decreasing the distance between location 426 and location 434, e.g. minimizing the distance between location 426 and location 434.

Alternatively, when there is no match for the interpolated location in candidate locations 432, comparison module 408 may determine a nearest neighbor of the interpolated location. Selection module 406 may select, as location 434, the nearest neighbor.

Method 700 may be repeated for other stages, for instance by iteratively subdividing the tracks and/or stages based on the stage corresponding to the interpolated location similar to a binary search, or by iterating through consecutive stages similar to a linear search, and repeating method 700. MRF locations for all stages may be selected in this way.

More specifically, in some embodiments, candidate module 404 may determine a fourth plurality of candidate locations for a fourth stage, which may be a second intermediate stage. The second intermediate stage may be between the first stage and the first intermediate stage. In some embodiments, the fourth stage may be an approximate midpoint stage between the first stage and the first intermediate stage (e.g., stage C between stage A and stage E). Interpolation module 410 may interpolate, based on the selected candidate locations for the first and first intermediate stages and a placement of the second intermediate stage between the first and first intermediate stages, a second interpolated location. Selection module 406 may select, for the second intermediate stage, one of the fourth plurality of candidate locations matching the second interpolated location.

In addition, candidate module 404 may determine a fifth plurality of candidate locations for a fifth stage. The fifth stage may be between the first intermediate stage and the second stage. In some embodiments, the fifth stage may be an approximate midpoint stage between the first intermediate stage and the second stage (e.g., stage G between stage E and stage H). Interpolation module 410 may interpolate, based on the selected candidate locations for the first intermediate and second stages and a placement of the fifth stage between the first intermediate and second stages, a third interpolated location. Selection module 406 may select, for the fifth stage, one of the fifth plurality of candidate locations matching the third interpolated location.

Alternatively, the intermediate stages between the first stage and the second stage may be iteratively interpolated. For instance, if the first stage corresponds to a start stage of a track (e.g., stage A), and the second stage corresponds to an end stage of a track (e.g., stage H), the intermediate stages may be analyzed in order between the start and end stages (e.g., iterating through stages B-G). Each stage may be analyzed by interpolation between the start and end stages as described above. More specifically, for each intermediate stage (e.g. stages B-G) between the first stage (e.g., stage A) and the second stage (stage H), candidate module 404 may determine a current plurality of candidate locations for the current stage. Interpolation module 410 may interpolate, based on the selected pair of candidate locations (e.g. for stages A and H) and a placement of the current stage between the first stage and the second stage, an interpolated location. Selection module 406 may select, for the current stage, one of the current plurality of candidate locations matching the interpolated location. When the interpolated location does not match one of the current plurality of candidate locations, comparison module 408 may decrease and/or minimize a distance from a selected location of an immediately prior stage. For example, comparison module 408 may find a nearest neighbor, from the current plurality of candidate locations, amongst the current plurality of candidate locations. Selection module 406 may select the location from the current plurality of candidate locations based on the analysis of comparison module 408.

As explained above, MR treatment may utilize MRF on oral appliances which may include a pair of engaged objects, structure, blocks, or other structures placed on the upper and lower jaws of the patient. The MRFs may take on various shapes, such as rigid wing shapes, curved shapes, blocks, etc. Two pairs of MRFs may be placed, one on each of the left and right sides, such that there may be four MRFs for each stage. MRFs may be used to treat, for instance, Class II malocclusions by enforcing mandible protrusion in a forward (e.g., anterior) direction.

MRF placement may span multiple stages (e.g., 20 to 50 stages), which may be grouped into tracks. For each stage, each MRF may require placement on a suitable location along the patient's jaw arch. There may be about 12 to 20 initial candidate locations on the jaw arch for placement. Continuous stages may exhibit little to no jaw movement for a track. For example, a track 1 of treatment may include stage 1 to stage 8, track 2 may include stage 9 to stage 16, etc. However, significant jaw movement may be expected between consecutive tracks, such as from the end of track 1 (e.g., stage 8) to the start of track 2 (e.g., stage 9). Conventional methods of selecting locations for each stage often stop after the first suitable location is found, which may result in unpredictable changes between stages, such as between stages 8 and 9.

The present disclosure describes an improvement to selecting MRF locations to decrease, and optimally minimize, the distance between MRF locations between stages and/or between tracks. By determining all successful candidate locations for each stage, and selecting candidate locations closest to each other, the distance between MRF locations may be decreased.

As described herein, a sequential method may include comparing pairs of candidate points between two stages. If any pair matches, the matching pair may be selected as MRF locations. For example, the start and end stages of a first track may be selected as such. When determining MRF locations for the next track, the selected pair for the first track may first be analyzed for suitability. For example, the same pair may be selected if available for the next track. If the first track's pair is not suitable, other pairs of locations may be analyzed in order of distance from the first track's pair. If no matching pair is found for the first track, then a pair of candidate points having the closest distance may be selected. In addition, to decrease and/or minimize the distance shift between tracks, the next track's analysis may begin with the MRF location selected for the end stage of the first track.

The sequential method may further be implemented in parallel, using for example a multi-core or multi-CPU computing device. For instance, each of the four MRFs may be independently analyzed and processed in order to more efficiently compute MRF locations.

However, running a placement algorithm for each stage, stage by stage, may be computationally less than ideal. The placement algorithm may be run for the start and end stages of each track, with intermediate stages determined through an interpolation scheme. If interpolation fails for a given intermediate stage, the single stage placement algorithm may be used for that intermediate stage. Conventionally, a binary search-like method using the single stage placement algorithm may be applied by running the single stage placement algorithm for the start stage and end stage of a given track, and linearly interpolating for a midpoint stage between the start and end stages. If interpolation fails, the single stage placement algorithm may be used for the midpoint stage. This interpolation may be recursively repeated for each half of the track.

As described herein, the interpolation may be improved. Increasing (e.g., doubling) the number of initial candidate locations for each stage for the single stage placement algorithm may allow a finer grade of location selection. Because a selected location for a next stage may likely be the same or nearby location, the increase in initial candidate locations may not require a similar increase (e.g. doubling) of computational resources.

Another improvement may include using a successful selected location to guide selection of the next stage's location in a deterministic way, as described herein. For instance, the next stage's location may start with the same selected location, and if unavailable, proceed with its nearest neighbors, branching out from the selected location until a suitable location is determined.

Yet another improvement may include interpolation which does not follow a binary search pattern. For example, the location of the start and end stages of a track (which may include an end stage of treatment) may be determined. Then, the second stage, following the start stage, may be analyzed using interpolation between the start and end locations. If the interpolation fails (e.g., the interpolated location is not available), the second stage analysis may begin with the start location and its closest neighbors as described above. The remaining intermediate frames may be determined sequentially (e.g., the third, fourth, etc.) in a similar manner until all stages have been determined.

Figure 8:
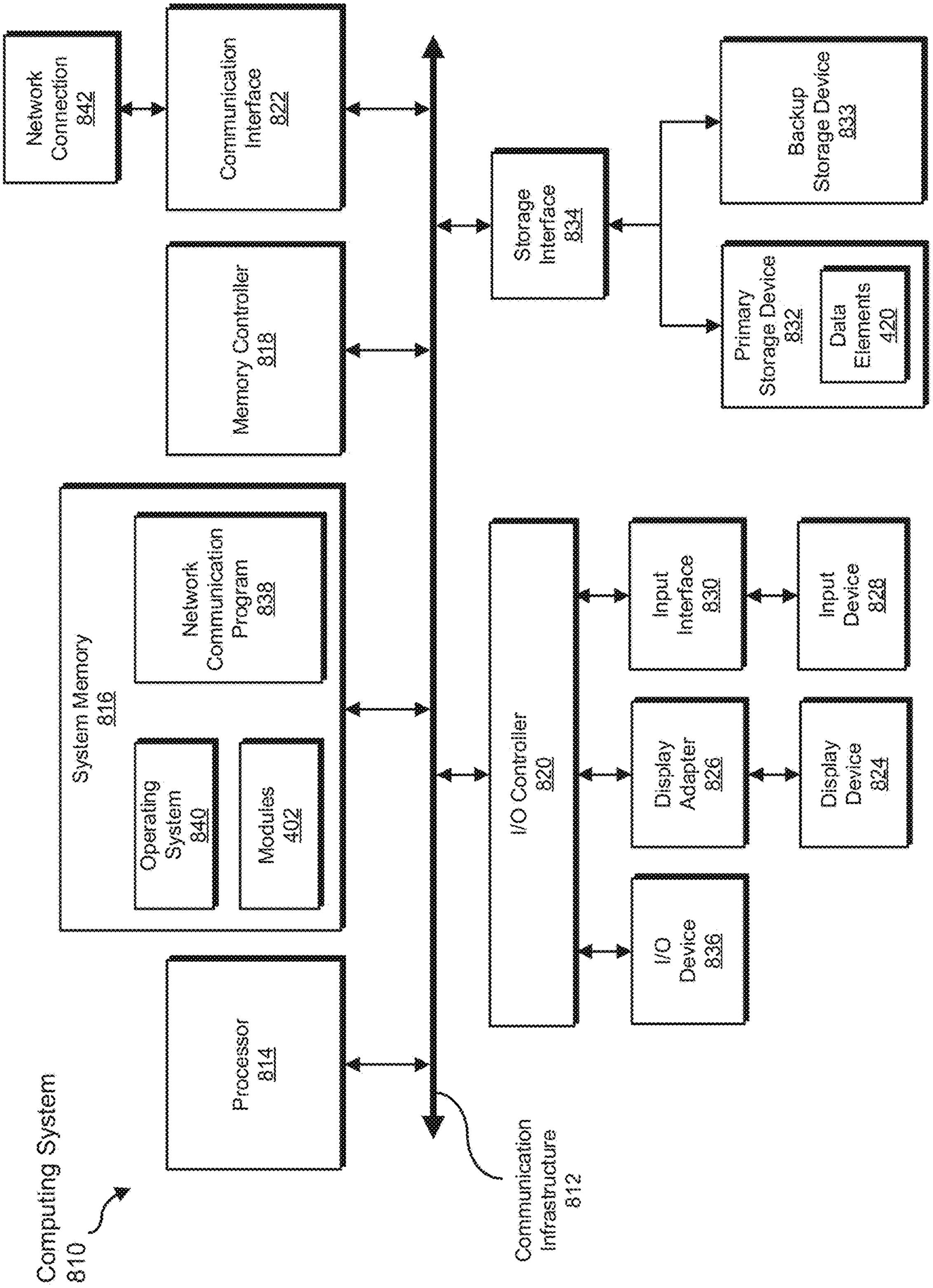
FIG. 8 shows a block diagram of an example computing system capable of implementing one or more embodiments described and/or illustrated herein, in accordance with some embodiments.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 5). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 402 from FIG. 4 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data elements 420 from FIG. 4 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term “computer-readable medium,” as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
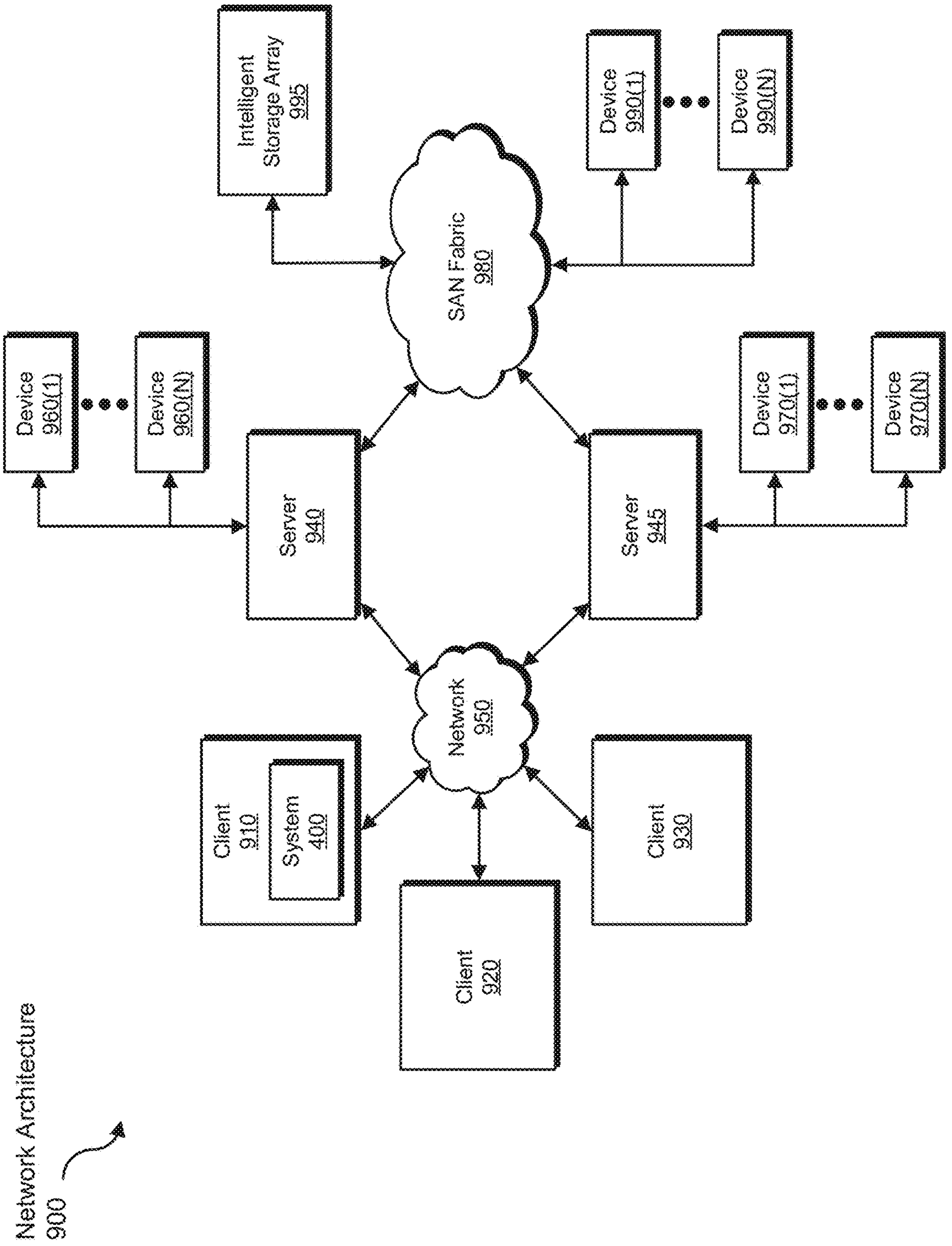
FIG. 9 shows a block diagram of an example computing network capable of implementing one or more of the embodiments described and/or illustrated herein, in accordance with some embodiments.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 5). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 400 from FIG. 4.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for selecting MRF locations for oral appliances for MR treatment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 400 in FIG. 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 400 in FIG. 4 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 400 in FIG. 4 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 400 in FIG. 4 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 400 in FIG. 4 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 400 in FIG. 4 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of" Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A method for selecting locations of mandibular relocation features (MRFs) on oral appliances comprising: determining a first plurality of candidate locations for placing a first MRF on a first oral appliance for a first stage of mandibular relocation (MR) treatment; determining a second plurality of candidate locations for placing a second MRF on a second oral appliance for a second stage of MR treatment; and selecting one of the first plurality of candidate locations for the first stage and one of the second plurality of candidate locations for the second stage based on decreasing a distance between a selected pair of candidate locations.

Clause 2. The method of clause 1, wherein the first stage of MR treatment corresponds to a start stage of a first track and the second stage of MR treatment corresponds to an end stage of the first track.

Clause 3. The method of clause 2, further comprising: determining a third plurality of candidate locations for a third MRF for a third stage of MR treatment on a third oral appliance, wherein the third stage corresponds to a start stage of a second track of MR treatment and the second track follows the first track; and selecting, for the third stage of MR treatment, one of the third plurality of candidate locations based on decreasing a distance between a selected one of the second plurality of candidate locations and the selected one of the third plurality of candidate locations.

Clause 4. The method of clause 2, further comprising: determining a third plurality of candidate locations for a third MRF for a third stage of MR treatment on a third oral appliance, wherein the third stage corresponds to a start stage of a second track and the second track follows the first track; determining a fourth plurality of candidate locations for a fourth MRF for a fourth stage of MR treatment on a fourth oral appliance, wherein the fourth stage corresponds to an end stage of the second track; and selecting one of the third plurality of candidate locations for the third stage and one of the fourth plurality of candidate locations for the fourth stage based on decreasing a distance between a selected one of the third plurality of candidate locations and a selected one of the fourth plurality of candidate locations.

Clause 5. The method of clause 1, further comprising: determining a third plurality of candidate locations for a first intermediate stage, wherein the first intermediate stage is located between the first stage and the second stage; interpolating, based on the selected pair of candidate locations and a placement of the first intermediate stage between the first stage and the second stage, an interpolated location; and selecting, for the first intermediate stage, one of the third plurality of candidate locations matching the interpolated location.

Clause 6. The method of clause 5, further comprising selecting the first intermediate stage based on a linear search between the first stage and the second stage.

Clause 7. The method of clause 5, further comprising selecting, for the first intermediate stage when the interpolated location does not match one of the third plurality of candidate locations, one of the third plurality of candidate locations based on minimizing a distance between the selected one of the first plurality of candidate locations and the selected one of the third plurality of candidate locations.

Clause 8. The method of clause 5, further comprising: determining a fourth plurality of candidate locations for a second intermediate stage, wherein the second intermediate stage is between the first stage and the first intermediate stage; interpolating, based on the selected candidate locations for the first and first intermediate stages and a placement of the second intermediate stage between the first and first intermediate stages, a second interpolated location; and selecting, for the second intermediate stage, one of the fourth plurality of candidate locations matching the second interpolated location.

Clause 9. The method of clause 8, further comprising selecting, for the second intermediate stage when the interpolated location does not match one of the fourth plurality of candidate locations, one of the fourth plurality of candidate locations based on minimizing a distance between the selected one of the first plurality of candidate locations and the selected one of the fourth plurality of candidate locations.

Clause 10. The method of clause 8, further comprising: determining a fifth plurality of candidate locations for a fifth stage, wherein the fifth stage is between the first intermediate stage and the second stage; interpolating, based on the selected candidate locations for the first intermediate and second stages and a placement of the fifth stage between the first intermediate and second stages, a third interpolated location; and selecting, for the fifth stage, one of the fifth plurality of candidate locations matching the third interpolated location.

Clause 11. The method of clause 10, wherein the first intermediate stage is approximately a midpoint stage between the first stage and the second stage, the second intermediate stage is approximately a midpoint stage between the first stage and the first intermediate stage, and the fifth stage is approximately a midpoint stage between the third stage and the second stage.

Clause 12. The method of clause 5, further comprising: determining a third plurality of candidate locations for a third stage, wherein the third stage immediately follows the first stage; interpolating, based on the selected pair of candidate locations and a placement of the third stage between the first stage and the second stage, an interpolated location; and selecting, for the third stage, one of the third plurality of candidate locations matching the interpolated location.

Clause 13. The method of clause 12, further comprising selecting, for the third stage when the interpolated location does not match one of the third plurality of candidate locations, one of the third plurality of candidate locations based on minimizing a distance between the selected one of the first plurality of candidate locations and the selected one of the third plurality of candidate locations.

Clause 14. The method of clause 5, further comprising, for each stage between the first stage and the second stage: determining a current plurality of candidate locations for the current stage; interpolating, based on the selected pair of candidate locations and a placement of the current stage between the first stage and the second stage, an interpolated location; and selecting, for the current stage, one of the current plurality of candidate locations matching the interpolated location.

Clause 15. The method of clause 14, further comprising selecting, for the current stage when the interpolated location does not match one of the current plurality of candidate locations, one of the current plurality of candidate locations based on decreasing a distance from a selected location of an immediately prior stage.

Clause 16. The method of clause 1, further comprising selecting from another plurality of candidate locations in parallel.

Clause 17. The method of clause 16, further comprising determining, in parallel to determining the first plurality of candidate locations, another plurality of candidate locations for placing another MRF on the first oral appliance.

Clause 18. The method of clause 1, wherein determining the first plurality of candidate points further comprises determining the first plurality of candidate points based on one or more parameters.

Clause 19. The method of clause 17, further comprising modifying the one or more parameters to increase a number of the first plurality of candidate points.

Clause 20. The method of clause 1, wherein decreasing the distance comprises selecting matching locations.

Clause 21. The method of clause 1, wherein decreasing the distance comprises selecting a closest neighbor to a selected location.

Clause 22. The method of clause 1, wherein decreasing the distance comprises minimizing the distance.

Clause 23. The method of clause 1, wherein the each of the appliances comprise one of a plurality of aligners to move a plurality of teeth from a plurality of first locations to a plurality of second locations with a plurality of tooth movement stages, wherein the MR treatment comprises a plurality of tracks and each of the plurality of tracks comprises a plurality of stages, each of the plurality of aligner stages comprising at least one of the plurality of aligners.

Clause 24. A system for selecting locations of mandibular relocation features (MRFs) on oral appliances comprising: a processor; and memory processor coupled to a memory configured with instructions that when executed cause the processor to: determine a first plurality of candidate locations for placing a first MRF on a first oral appliance for a first stage of mandibular relocation (MR) treatment; determine a second plurality of candidate locations for placing a second MRF on a second oral appliance for a second stage of MR treatment; and select one of the first plurality of candidate locations for the first stage and one of the second plurality of candidate locations for the second stage based on decreasing a distance between a selected pair of candidate locations.

Clause 25. The systems of clause 24, wherein the first stage of MR treatment corresponds to a start stage of a first track and the second stage of MR treatment corresponds to an end stage of the first track.

Clause 26. The system of clause 25, wherein: the memory is further configured with instruction that when executed cause the processor to: determine a third plurality of candidate locations for a third MRF for a third stage of MR treatment on a third oral appliance, wherein the third stage corresponds to a start stage of a second track of MR treatment and the second track follows the first track; and select, for the third stage of MR treatment, one of the third plurality of candidate locations based on decreasing a distance between a selected one of the second plurality of candidate locations and the selected one of the third plurality of candidate locations.

Clause 27. The system of clause 25, wherein: the memory is further configured with instruction that when executed cause the processor to: determine a third plurality of candidate locations for a third MRF for a third stage of MR treatment on a third oral appliance, wherein the third stage corresponds to a start stage of a second track and the second track follows the first track; determine a fourth plurality of candidate locations for a fourth MRF for a fourth stage of MR treatment on a fourth oral appliance, wherein the fourth stage corresponds to an end stage of the second track; and select one of the third plurality of candidate locations for the third stage and one of the fourth plurality of candidate locations for the fourth stage based on decreasing a distance between a selected one of the third plurality of candidate locations and a selected one of the fourth plurality of candidate locations.

Clause 28. The system of clause 24, wherein: the memory is further configured with instruction that when executed cause the processor to: determine a third plurality of candidate locations for a first intermediate stage, wherein the first intermediate stage is located between the first stage and the second stage; interpolate, based on the selected pair of candidate locations and a placement of the first intermediate stage between the first stage and the second stage, an interpolated location; and select, for the first intermediate stage, one of the third plurality of candidate locations matching the interpolated location.

Clause 29. The system of clause 28, wherein: the memory is further configured with instruction that when executed cause the processor to: select the first intermediate stage based on a linear search between the first stage and the second stage.

Clause 30. The system of clause 28, wherein: the memory is further configured with instruction that when executed cause the processor to: select, for the first intermediate stage when the interpolated location does not match one of the third plurality of candidate locations, one of the third plurality of candidate locations based on minimizing a distance between the selected one of the first plurality of candidate locations and the selected one of the third plurality of candidate locations.

Clause 31. The system of clause 28, wherein: the memory is further configured with instruction that when executed cause the processor to: determine a fourth plurality of candidate locations for a second intermediate stage, wherein the second intermediate stage is between the first stage and the first intermediate stage; interpolate, based on the selected candidate locations for the first and first intermediate stages and a placement of the second intermediate stage between the first and first intermediate stages, a second interpolated location; and select, for the second intermediate stage, one of the fourth plurality of candidate locations matching the second interpolated location.

Clause 32. The system of clause 31, wherein: the memory is further configured with instruction that when executed cause the processor to: select, for the second intermediate stage when the interpolated location does not match one of the fourth plurality of candidate locations, one of the fourth plurality of candidate locations based on minimizing a distance between the selected one of the first plurality of candidate locations and the selected one of the fourth plurality of candidate locations.

Clause 33. The system of clause 31, wherein: the memory is further configured with instruction that when executed cause the processor to: determine a fifth plurality of candidate locations for a fifth stage, wherein the fifth stage is between the first intermediate stage and the second stage; interpolate, based on the selected candidate locations for the first intermediate and second stages and a placement of the fifth stage between the first intermediate and second stages, a third interpolated location; and select, for the fifth stage, one of the fifth plurality of candidate locations matching the third interpolated location.

Clause 34. The system of clause 33, wherein the first intermediate stage is approximately a midpoint stage between the first stage and the second stage, the second intermediate stage is approximately a midpoint stage between the first stage and the first intermediate stage, and the fifth stage is approximately a midpoint stage between the third stage and the second stage.

Clause 35. The system of clause 28, wherein: the memory is further configured with instruction that when executed cause the processor to: determine a third plurality of candidate locations for a third stage, wherein the third stage immediately follows the first stage; interpolate, based on the selected pair of candidate locations and a placement of the third stage between the first stage and the second stage, an interpolated location; and select, for the third stage, one of the third plurality of candidate locations matching the interpolated location.

Clause 36. The system of clause 35, wherein: the memory is further configured with instruction that when executed cause the processor to: select, for the third stage when the interpolated location does not match one of the third plurality of candidate locations, one of the third plurality of candidate locations based on minimizing a distance between the selected one of the first plurality of candidate locations and the selected one of the third plurality of candidate locations.

Clause 37. The system of clause 28, wherein: the memory is further configured with instruction that when executed cause the processor to, for each stage between the first stage and the second stage: determine a current plurality of candidate locations for the current stage; interpolate, based on the selected pair of candidate locations and a placement of the current stage between the first stage and the second stage, an interpolated location; and select, for the current stage, one of the current plurality of candidate locations matching the interpolated location.

Clause 38. The system of clause 37, wherein: the memory is further configured with instruction that when executed cause the processor to: select, for the current stage when the interpolated location does not match one of the current plurality of candidate locations, one of the current plurality of candidate locations based on decreasing a distance from a selected location of an immediately prior stage.

Clause 39. The system of clause 24, wherein: the memory is further configured with instruction that when executed cause the processor to: select from another plurality of candidate locations in parallel.

Clause 40. The system of clause 39, wherein: the memory is further configured with instruction that when executed cause the processor to: determine, in parallel to determining the first plurality of candidate locations, another plurality of candidate locations for placing another MRF on the first oral appliance.

Clause 41. The system of clause 24, wherein: the instructions that cause the processor to determine the first plurality of candidate points further causes the processor to determine the first plurality of candidate points based on one or more parameters.

Clause 42. The system of clause 40, wherein: the memory is further configured with instruction that when executed cause the processor to: modify the one or more parameters to increase a number of the first plurality of candidate points.

Clause 43. The system of clause 24, wherein decreasing the distance comprises selecting matching locations.

Clause 44. The system of clause 24, wherein decreasing the distance comprises selecting a closest neighbor to a selected location.

Clause 45. The system of clause 24, wherein decreasing the distance comprises minimizing the distance.

Clause 46. The system of clause 24, wherein the each of the appliances comprise one of a plurality of aligners to move a plurality of teeth from a plurality of first locations to a plurality of second locations with a plurality of tooth movement stages, wherein the MR treatment comprises a plurality of tracks and each of the plurality of tracks comprises a plurality of stages, each of the plurality of aligner stages comprising at least one of the plurality of aligners.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method for selecting locations of mandibular relocation features (MRFs) on oral appliances for treatment of a patient comprising:

determining a first plurality of candidate locations for placing a first MRF on a first oral appliance for a first stage of mandibular relocation (MR) treatment of the patient;

determining a second plurality of candidate locations for placing a second MRF on a second oral appliance for a second stage of MR treatment of the patient;

determining one or more of the first plurality of candidate locations that is in a matching location as one or more of the second plurality of candidate locations;

selecting pairs of candidate locations, each pair including a location of the first plurality of candidate locations for the first stage and a location of the second plurality of candidate locations wherein the location of the first plurality of candidate location matches the location of the second plurality of candidate locations;

placing a first MRF at the location of the first plurality of candidate locations of a first of the pairs for the first stage, and for placing, a second MRF at the location of the second plurality of candidate locations of a second of the pairs for the second stage, different than the location of the first plurality of candidate location; and providing instructions to generate the first oral appliance having the first MRF at the location of the first plurality of candidate locations, and the second oral appliance having the second MRF at the location of the second plurality of candidate locations, wherein the first oral appliance and the second oral appliance are fabricated based on the instructions.

2. The method of claim 1, wherein the first stage of MR treatment corresponds to a start stage of a first track and the second stage of MR treatment corresponds to an end stage of the first track.

3. The method of claim 2, further comprising:

determining a third plurality of candidate locations for a third MRF for a third stage of MR treatment on a third oral appliance, wherein the third stage corresponds to a start stage of a second track of MR treatment and the second track follows the first track; and selecting, for the third stage of MR treatment, one of the third plurality of candidate locations based on decreasing a distance between the selected one of the second plurality of candidate locations and the selected one of the third plurality of candidate locations.

4. The method of claim 2, further comprising:

determining a third plurality of candidate locations for a third MRF for a third stage of MR treatment on a third oral appliance, wherein the third stage corresponds to a start stage of a second track and the second track follows the first track;

determining a fourth plurality of candidate locations for a fourth MRF for a fourth stage of MR treatment on a fourth oral appliance, wherein the fourth stage corresponds to an end stage of the second track; and selecting one of the third plurality of candidate locations for the third stage and one of the fourth plurality of candidate locations for the fourth stage based on decreasing a distance between a selected one of the third plurality of candidate locations and a selected one of the fourth plurality of candidate locations.

5. The method of claim 1, further comprising:

determining a third plurality of candidate locations for a first intermediate stage, wherein the first intermediate stage is one of at least two or more intermediate stages and is located between the first stage and the second stage;

interpolating, based on the selected pair of candidate locations and a placement of the first intermediate stage between the first stage and the second stage, an interpolated location; and selecting, for the first intermediate stage, one of the third plurality of candidate locations matching the interpolated location.

6. The method of claim 5, further comprising selecting the first intermediate stage based on a linear search between the first stage and the second stage.

7. The method of claim 5, further comprising selecting, for the first intermediate stage when the interpolated location does not match one of the third plurality of candidate locations, one of the third plurality of candidate locations based on minimizing a distance between the selected one of the first plurality of candidate locations and the selected one of the third plurality of candidate locations.

8. The method of claim 5, further comprising:

determining a fourth plurality of candidate locations for a second intermediate stage, wherein the second intermediate stage is between the first stage and the first intermediate stage;

interpolating, based on the locations for the first and first intermediate stages and a placement of the second intermediate stage between the first and first intermediate stages, a second interpolated location; and selecting, for the second intermediate stage, one of the fourth plurality of candidate locations matching the second interpolated location.

9. The method of claim 8, further comprising selecting, for the second intermediate stage when the interpolated location does not match one of the fourth plurality of candidate locations, one of the fourth plurality of candidate locations based on minimizing a distance between the selected one of the first plurality of candidate locations and the selected one of the fourth plurality of candidate locations.

10. The method of claim 8, further comprising:

determining a fifth plurality of candidate locations for a fifth stage, wherein the fifth stage is between the first intermediate stage and the second stage;

interpolating, based on the candidate locations for the first intermediate and second stages and a placement of the fifth stage between the first intermediate and second stages, a third interpolated location; and selecting, for the fifth stage, one of the fifth plurality of candidate locations matching the third interpolated location.

11. The method of claim 10, wherein the first intermediate stage is approximately a midpoint stage between the first stage and the second stage, the second intermediate stage is approximately a midpoint stage between the first stage and the first intermediate stage, and the fifth stage is approximately a midpoint stage between the first intermediate stage and the second intermediate stage.

12. The method of claim 1, further comprising:

determining a third plurality of candidate locations for a third stage, wherein the third stage immediately follows the first stage;

interpolating, based on the selected pair of candidate locations and a placement of the third stage between the first stage and the second stage, an interpolated location; and selecting, for the third stage, one of the third plurality of candidate locations matching the interpolated location.

13. The method of claim 12, further comprising selecting, for the third stage when the interpolated location does not match one of the third plurality of candidate locations, one of the third plurality of candidate locations based on minimizing a distance between the selected one of the first plurality of candidate locations and the selected one of the third plurality of candidate locations.

14. The method of claim 1, further comprising, a plurality of stages between the first stage and the second stage, for each stage between the first stage and the second stage:

determining a current plurality of candidate locations for a current stage;

interpolating, based on the selected pair of candidate locations and a placement of the current stage between the first stage and the second stage, an interpolated location; and selecting, for the current stage, one of the current plurality of candidate locations matching the interpolated location.

15. The method of claim 14, further comprising selecting, for the current stage when the interpolated location does not match one of the current plurality of candidate locations, one of the current plurality of candidate locations based on decreasing a distance from a selected location of an immediately prior stage.

16. The method of claim 1, further comprising selecting from a third plurality of candidate locations in parallel to selecting one of the first plurality of candidate locations.

17. The method of claim 16, further comprising determining, in parallel to determining the first plurality of candidate locations, the third plurality of candidate locations for placing a third MRF on the first oral appliance.

18. The method of claim 1, wherein determining the first plurality of candidate locations further comprises determining the first plurality of candidate locations based on one or more parameters.

19. The method of claim 18, further comprising modifying the one or more parameters to increase a number of the first plurality of candidate locations.

20. The method of claim 1, further comprising:

determining a third plurality of candidate locations for a first intermediate stage, wherein the first intermediate stage is located between the first stage and the second stage;

interpolating, based on the selected pair of candidate locations and a placement of the first intermediate stage between the first stage and the second stage, an interpolated location;

selecting, for the first intermediate stage, one of the third plurality of candidate locations matching the interpolated location;

locating a third MRF at the selected one of the third plurality of candidate locations matching the interpolated for the first intermediate stage;

providing instructions to generate a third oral appliance having the third MRF at the selected one of the third plurality of candidate locations.

* * * * *